R. G. JENNY.
CORN RAKE AND ELEVATING MACHINE.
APPLICATION FILED OCT. 21, 1909.
964,471.
Patented July 12, 1910.
2 SHEETS—SHEET 1.
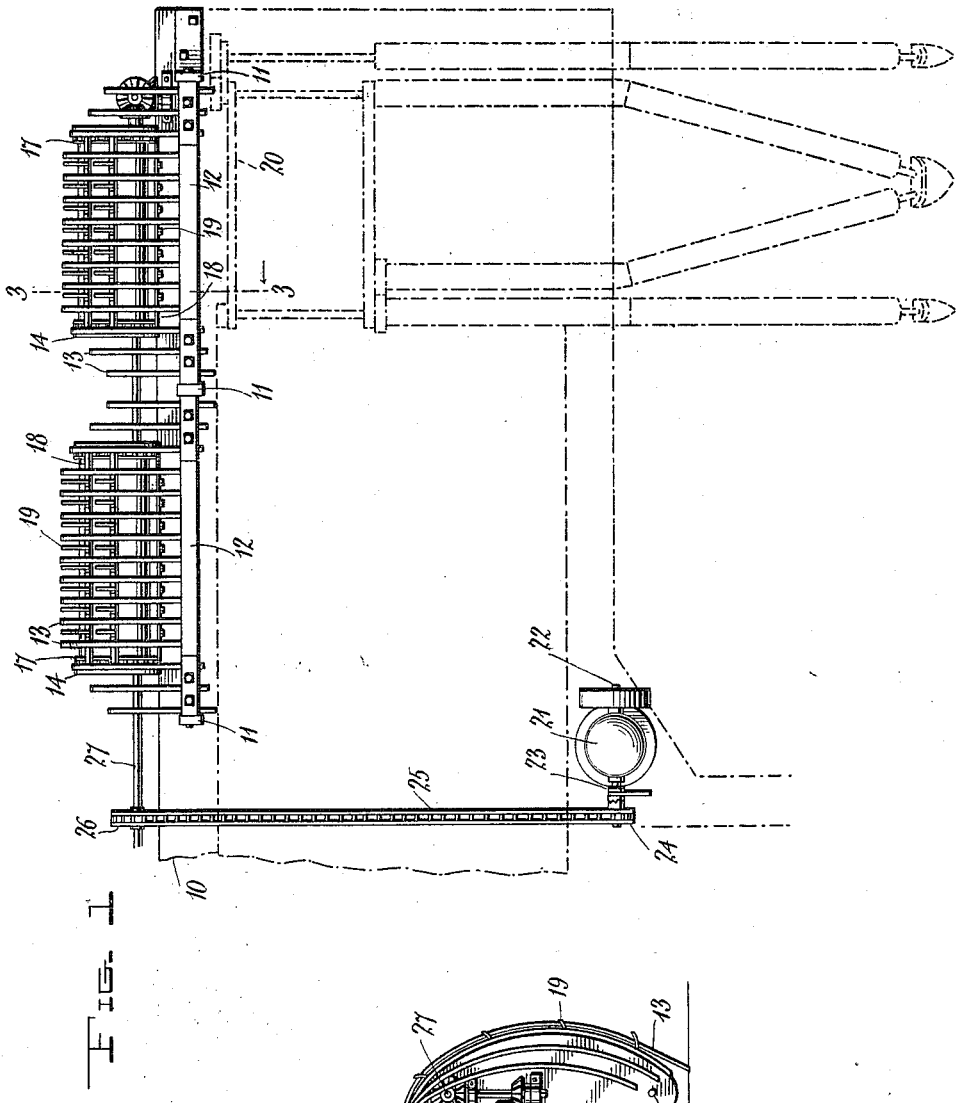
Witnesses
Inventor
Rudolf G. Jenny
By Chandler & Chandler
Attorneys

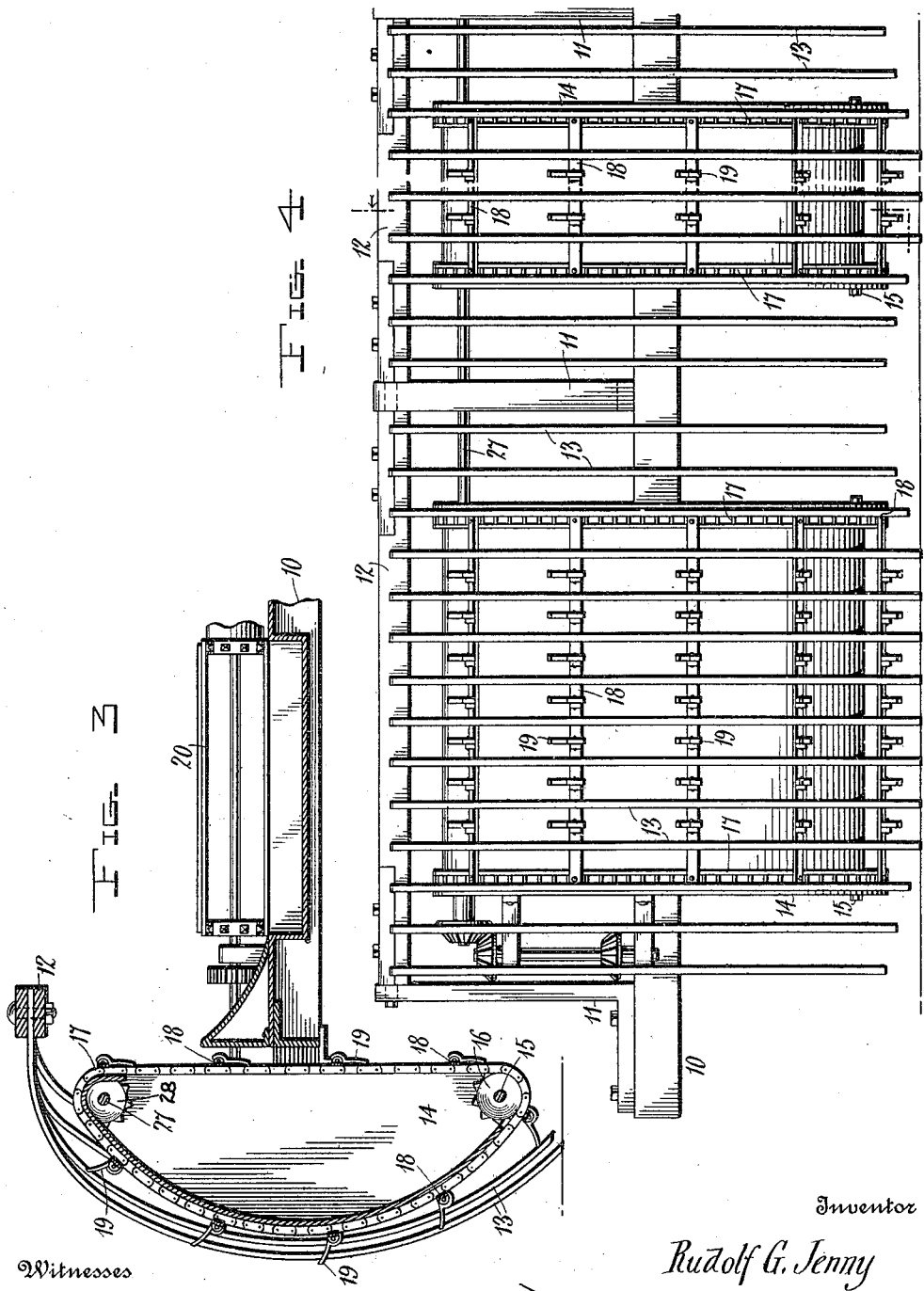

UNITED STATES PATENT OFFICE.

RUDOLF G. JENNY, OF LEIGH, NEBRASKA.

CORN RAKE AND ELEVATING MACHINE.

964,471.  Specification of Letters Patent.  Patented July 12, 1910.

Original application filed June 23, 1909, Serial No. 503,869. Divided and this application filed October 21, 1909. Serial No. 523,899.

*To all whom it may concern:*

Be it known that I, RUDOLF G. JENNY, a citizen of the United States, residing at Leigh, in the county of Colfax, State of Nebraska, have invented certain new and useful Improvements in Corn Rake and Elevating Machines; and I do hereby declare the following to be a full, clear, and exact description of the invention, such as will enable others skilled in the art to which it appertains to make and use the same.

The invention relates to a combined rake and elevator mechanism and more particularly to the class of combined rake and elevator mechanism for corn harvesting and husking machines.

The primary object of the invention is the provision of mechanism of this character in which ears of corn loose on and distributed upon the ground may be gathered by the rake and lifted by the elevating mechanism onto the harvesting and husking machine during the advancement thereof through a field.

Another object of the invention is the provision of mechanism of this character in which loose corn may be gathered and elevated from the ground onto a husking machine so that the latter may operate upon the ears of corn to husk the same so as to be finally disposed of by depositing them from the machine to a wagon or the like.

In the drawings accompanying and forming part of this invention is illustrated the preferred form of embodiment of the invention, which to enable those skilled in the art to carry the invention into practice, will be set forth at length in the following description, setting forth in detail the organization and arrangement of parts, while the novelty of the invention will be pointed out in the claim hereunto appended.

In the drawings:—Figure 1 is a top plan view of a portion of a corn husking machine with the invention applied thereto. Fig. 2 is a fragmentary end elevation of the rake and elevating mechanism. Fig. 3 is a sectional view on the line 3—3 of Fig. 1. Fig. 4 is an enlarged rear elevation of the rake and elevator mechanism.

Similar reference characters indicate corresponding parts throughout the several views in the drawings.

Referring to the drawings by numerals 10 designates the main platform of a corn harvesting and husking machine the detail description of which is set forth in the co-pending application Serial No. 503,869, filed June 23, 1909, this application being a division thereof.

Rising vertically from the main platform 10, near its rear edge are spaced uprights 11, in which are journaled alining rake heads 12, the same having outwardly bowed depending rake teeth or tines 13, which latter are adapted to collect or accumulate loose ears of corn upon the ground during the forward travel of the machine.

Projecting rearwardly from the main platform 10, are vertically disposed elevator supporting frames 14, in the lower ends of which are supported horizontal shafts 15, upon which are fixed sprockets 16, over which are trained sprocket chains 17, carrying slats 18, of endless elevators which slats have transverse rows of hinged prongs or teeth 19, the same being adapted to engage the loose ears of corn collected or accumulated by the rakes so as to convey the ears upwardly and onto the conveyer 20, of the corn harvesting and husking machine. This conveyer 20 serves to deliver ears of corn to an elevator which subsequently feeds the ears of corn to the husking rollers of the machine.

Supported upon the main platform 10, is a gasolene or other suitable motor or engine 21, the driving shaft 22 of which has slidably keyed thereto a clutch head 23, the same adapted to be brought into locked or unlocked engagement with a driven sprocket wheel 24, over which is trained a sprocket chain 25, the latter also trained over a sprocket wheel 26, fixed to a driven shaft 27, the latter suitably journaled in bearings mounted on the main platform of the machine. This driven shaft 27, is also journaled in the elevator supporting frames 14, and carries a sprocket wheel 28 over which are trained the sprocket chains 17, carrying the slats 18 of the endless elevators and through the medium of this shaft 27, motion is imparted to the said endless elevator from the motor or engine as the machine is advanced through a field.

It will be apparent that during the advancement of the machine the tines 13 of the rake will gather all loose ears upon the ground in the path thereof and by the elevators the said ears will be deposited onto the machine to be subsequently moved onto the husking rollers and after the husking operation thereof to be finally delivered from the machine to a wagon or the like.

From the foregoing the construction and operation of the invention will be clearly apparent without the necessity of a more extended explanation and therefore the same has been omitted.

What is claimed is:—

In a corn rake and elevating machine a main platform, spaced vertical uprights rising from the rear end of the platform, rake heads journaled in said uprights, outwardly bowed depending rake teeth secured to said rake heads and having their lower ends terminating in close proximity to the ground for collecting material upon the ground during the advancement of the machine, elevator supporting frames disposed forwardly of the rake teeth and secured to the rear edge of the platform, each supporting frame having an outwardly bowed rear facing plate, horizontal shafts journaled in the upper and lower ends of the frames, sprocket wheels on said shafts, sprocket chains trained over the said sprocket wheels and traversing said outwardly bowed facing plate of the frame, spaced transverse slats connected with said chains and a row of spaced prongs hinged to each of said slats, the said frames being of a length to extend in close proximity to the ground and outwardly bowed plates thereof serving to bring the prongs into close coöperative relation to the rake teeth whereby the prongs will lift the loose material collected or accumulated by the rakes so as to convey the material upwardly in a compact manner on to the platform.

In testimony whereof, I affix my signature, in presence of two witnesses.

RUDOLF G. JENNY.

Witnesses:
   W. A. WENK,
   W. J. TROJAN.